Jan. 2, 1934.     G. C. APPEL ET AL     1,942,350
STORAGE BATTERY AND METHOD OF MAKING THE SAME
Filed Dec. 3, 1928     2 Sheets-Sheet 1
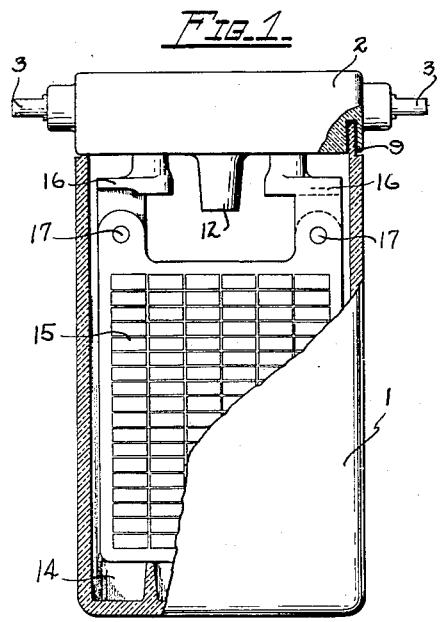
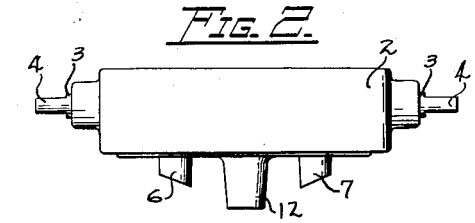
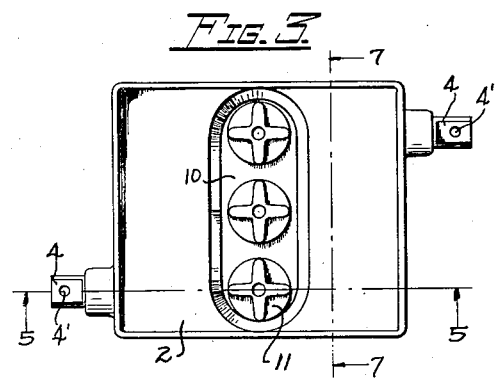
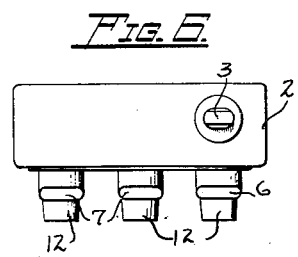
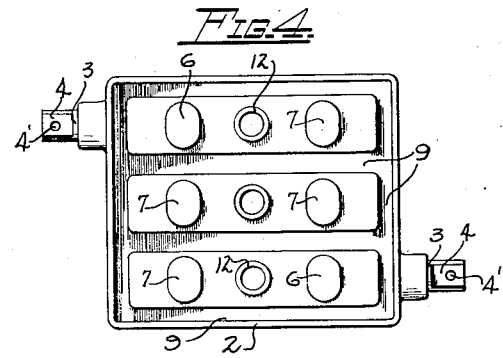
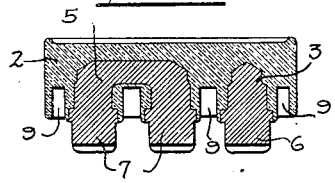
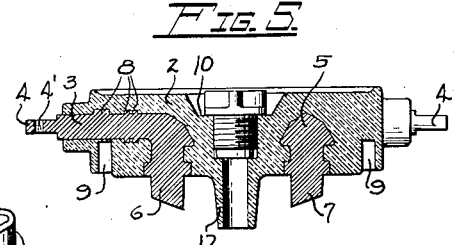
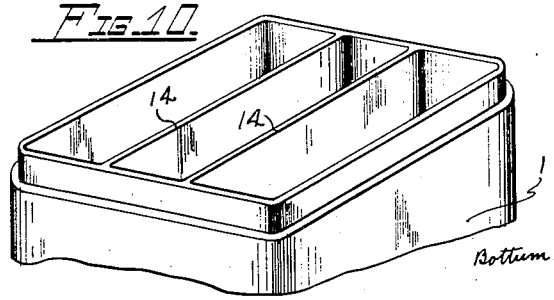
INVENTORS.
George C. Appel
Robert W. Vicarey
and John D. Wanvig Jr.
BY
Bottum, Hudnall, Lecher, McNamara & Michael
ATTORNEYS.

Jan. 2, 1934.   G. C. APPEL ET AL   1,942,350
STORAGE BATTERY AND METHOD OF MAKING THE SAME
Filed Dec. 3, 1928   2 Sheets-Sheet 2
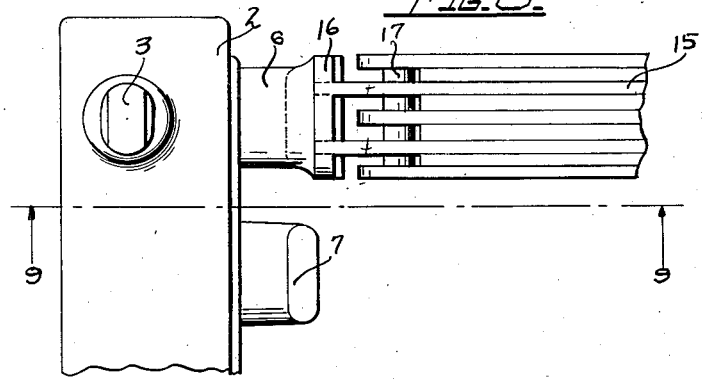
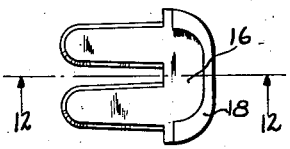
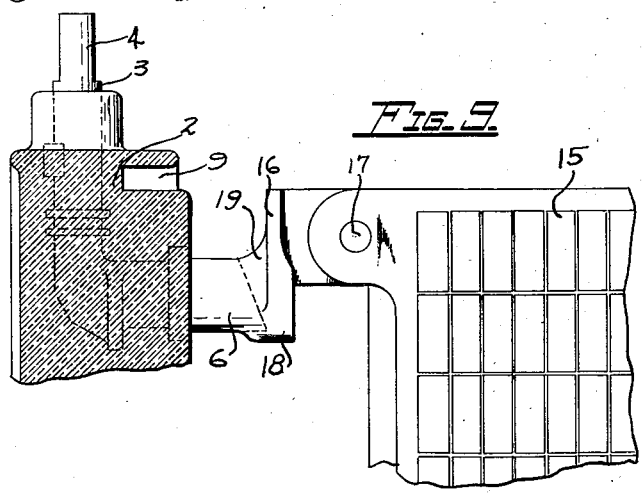
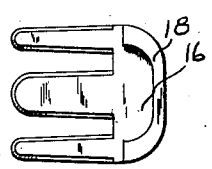
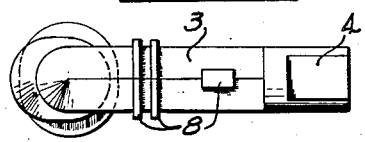
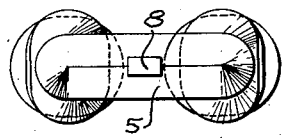
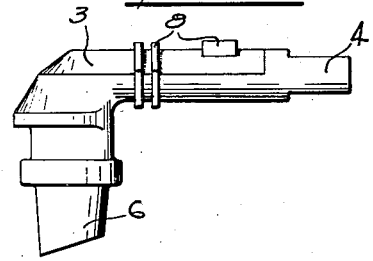
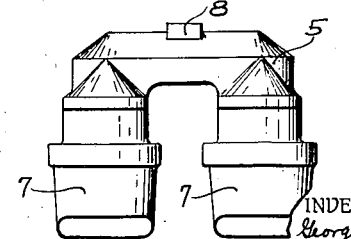
INVENTORS
George C. Appel
Robert W. Vicarey
and John D. Wanvig Jr.
BY
Bottum, Hudnall, Lecher, McNamara & Michael
ATTORNEYS Patented Jan. 2, 1934

1,942,350

UNITED STATES PATENT OFFICE 1,942,350

STORAGE BATTERY AND METHOD OF MAKING THE SAME

George C. Appel, Robert W. Vicarey, and John D. Wanvig, Jr., Milwaukee, Wis., assignors to Globe-Union Mfg. Co., Milwaukee, Wis., a corporation of Wisconsin Application December 3, 1928. Serial No. 323,414

9 Claims. (Cl. 136—134)

This invention relates to storage batteries and more particularly to covers, terminals and connectors for storage batteries.

Heretofore, considerable trouble has been experienced in storage batteries having acid electrolytes due to the leakage of acid through the vents in the cover or around the posts or connectors and also to corrosion and loosening of the latter. This leakage, corrosion and loosening is more noticeable in batteries used on automobiles or motorcycles because of the vibration transmitted to the battery by the machine. Acid which has thus leaked from the jar or cover corrodes the exposed metal parts of the battery or the supporting frame and particularly the terminals and connectors.

An object of this invention is to provide a storage battery having improved means for interconnecting the cells of the battery and for connecting terminals to the end poles thereof in order to prevent such electrical connecting devices from becoming loosened by vibration and to prevent leakage of the acid of the battery around such devices.

Another object of this invention is to provide a battery in which the terminals and connectors are made integral with the plates and which are enclosed in insulating material as much as possible so as to prevent corrosion thereof.

Another object is to provide a construction of storage battery terminals and connectors which is strong and rigid.

A further object is to provide a novel method of mounting the connectors and terminals of a storage battery in the cover thereof and in connecting them to the plates or electrodes, and in which better and more permanent connections can be made in less time than in methods heretofore used.

A further object is to provide a battery with a cover which carries the terminals and connectors and yet is smooth and easily cleaned and which has no metal parts on the top and no obstructions thereon except the vent plugs.

Another object of the invention is to provide novel means for mechanically supporting all of the plates of a storage battery on the cover and for securing the plates together.

A further object is to provide a novel strap construction for storage battery cells.

Other objects and advantages in both the method employed and the article manufactured will appear hereinafter.

In accomplishing the above objects, angular or bent terminals and cell connectors are molded in the cover of the battery jar in such a way that ends of the terminals extend on opposite sides of the top to provide external connecting posts while the other ends of the terminals and the ends of the connectors project downwardly through the lower surface of the cover to be then burned or otherwise secured to the straps or transverse supporting connections secured to the plates of the cells and which constitute the poles thereof.

This invention thus contemplates a construction of terminals and connectors in which the manufacture of the battery is greatly facilitated and the strength and quality increased by the provision of such a construction and method.

In the drawings:

Figure 1 is a view of the complete battery partly in side elevation and partly in section;

Figure 2 is a side view in elevation of the cover unit which carries the cell connectors and terminals of the battery.

Figure 3 is a plan view of the cover in Figure 2.

Figure 4 is a plan view of the underside of the cover before the electrodes or plates are secured thereto;

Figure 5 is a cross sectional view on the line 5—5 of Figure 3.

Figure 6 is a side view of the cover as viewed from either the right or left of Figure 2.

Figure 7 is a cross sectional view on the line 7—7 of Figure 3;

Figure 8 is a fragmentary plan view of the cover and plates showing how the plates are fastened to the cover during the manufacture of the battery.

Figure 9 is a cross sectional view on the line 9—9 of Figure 8;

Figure 10 is a fragmentary perspective view of the battery jar;

Figure 11 is a plan view of one of the straps;

Figure 12 is a sectional view of the strap on the line 12—12 of Figure 11.

Figure 13 is a plan view of another form of strap;

Figure 14 is a plan view of a terminal member;

Figure 15 is a view in side elevation of the terminal member;

Figure 16 is a plan view of cell connector; and

Figure 17 is a view in side elevation of the connector.

In the drawings the reference numeral 1 indicates a battery jar which may be made of rubber or other insulating material and which is provided with partitions 14 for dividing it into cells. The cover 2, which may also be made of rubber, is adapted to fit snugly over the upper portion of the jar and may be provided with channels 9 for cooperating with the partitions in the jar to enclose each cell. The cover is provided with a recess 10 on the top surface thereof and with customary vent tubes 12 which have passageways extending through the cover into the recess 10. Suitable plugs 11 may be provided for the vent tubes, as is usual in such constructions.

Terminals 3 and connectors 5 are imbedded in the cover so as to be rigidly secured therein. The terminals 3 consist of an angular piece of metal of the shape shown in Figures 14 and 15 and are preferably made of a lead alloy. Each terminal has an end which is adapted to project laterally from the side of the cover to provide a connecting post 4 which may be drilled as shown at 4' for providing means for making an external electrical connection with the battery. The other end 6 of the angular terminal 3 is adapted to project downwardly through the bottom of the cover and is beveled as shown to aid in securing the terminal to a strap as will be explained hereinafter. In order to prevent the terminal from being easily loosened from the cover in which it is imbedded, suitable projections 8 which may be of any irregular shape are provided on the terminal member.

The cell connectors 5 imbedded in the cover consist of U-shaped members of conducting material which may also be made of a lead alloy and which have downwardly projecting ends 7 beveled like the ends of the terminals. These connectors are also proovided with projections 8 for aiding in rigidly securing them to the cover in which they are imbedded.

In constructing the cover unit shown in Figures 2 to 7, which is designed for a three cell battery, two terminals and two connectors are arranged so that the downwardly projecting beveled ends of the terminals and connectors are arranged in rows of three each, on opposite sides of the cover. As shown in Figure 5, the beveling on the ends 6 and 7 of the connecting devices is such that the longer portion of the ends are on the inner sides thereof toward the center-line of the battery. The purpose of these beveled ends will be explained hereafter. The insulating material which may form the body of the cover is then molded around the terminals and connectors so as to hold them in this spaced position. Preferably the insulating material completely surrounds the metal parts except for the ends thereof so that no metal parts are exposed on the top of the cover.

After the terminals and connectors have been molded in the cover so as to be rigidly secured thereto as shown in Figures 2 to 7 inclusive, the downwardly projecting ends are rigidly secured to the plates. Before this is done, however, the plates 15 are assembled in units as shown in Figures 8 and 9, each unit consisting of positive and negative plates secured to connecting straps 16 at the top thereof. While any even number of positive plates and any uneven number of negative plates may be used, the construction shown consists of two positive and three negative plates in each cell. The positive plates are electrically and mechanically connected to the positive strap while the negative plates are connected to this strap by insulating means such as the pin 17. The negative strap is electrically connected to the negative plates, while the positive plates are connected thereto through a similar insulating pin 17. These straps are preferably provided with slots or recesses as shown in Figures 11, 12 and 13 equal to the number of plates to be burned or otherwise secured thereto. Thus in the construction described, the positive strap of Figure 13 has two slots therein while the negative strap of Figures 11 and 12 has a central slot and two recesses at the sides. These straps when secured to the plates of a cell constitute the positive and negative poles thereof.

The straps are further provided with shoulders 18 for cooperating with the beveled ends 6 and 7 of the connecting devices to form a pocket for maintaining molten metal in place when the straps are burned to the ends of the terminals and connectors. This construction is such as to facilitate the burning of the straps to the ends of the connecting devices. In proceeding with this step in the manufacture of the battery, a plurality of the plate units, with the straps connected thereto may be arranged side by side in a row.

With the plate units so arranged, the straps are in a vertical plane, as shown in Figure 9, there being, of course, two rows of straps, one at the bottom and one at the top of each set of plates. In each row, the straps constitute alternate positive and negative poles of the battery. With the plates and straps so arranged a plurality of cover units may be placed in juxtaposition with the straps so that the projecting ends 6 and 7 of the terminals and connectors are spaced similarly to and engage the straps, the longer portions of the ends interfitting with the curved shoulders 18 of the straps to form pockets. The straps may then be fused or integrally united to the ends of the terminals or connectors with which they are associated. This may be accomplished by a burning process in which the flame of a torch is first directed against the abutting ends of the parts to produce an initial fusion, after which metal is added from a stick of lead or the like to fill the pocket. It will be seen that because of the construction of the ends 6 and 7 of the connecting devices and the shape of the straps, this step may be easily and rapidly accomplished. Because the pocket formed is vertical, the molten metal tends to fill it without running over the sides of the strap where it is not needed, and because all of the straps are arranged in rows, the operator merely has to burn metal in each pocket to make the proper connections. After the top row of straps have been burnt to the ends of the connecting devices associated therewith, the entire number of plates and cover units are turned over and the straps on the other side are similarly burnt to the connecting devices on the other side of the cover, to complete the mechanical and electrical connections between the plates and the cover units.

By this operation, it will be seen that all of the plates are integrally connected to the terminals, connectors and cover and that the cells are electrically connected in series. The cover and plates may then be lifted bodily and inserted in the battery jar 1, after which a sealing compound may be applied at the joint and acid and water placed in the jar through the vent openings in the cover to complete the battery in the usual manner.

In the above described battery, the terminals are shown as angular in shape and projecting laterally from the cover and the cover is shown and described as made of insulating material. It is obvious, however, that these details as well as others are susceptible of change and modification within the scope of the invention. For instance, the terminals might be straight and extend out through the top of the battery or the cover might be constructed of material other than insulation but provided with insulating bushings or other means for preventing short-circuiting of the battery or the cells thereof. It is also apparent that the terminals and cell connectors might be held in position in various ways without being imbedded in the cover as shown.

Thus, while only one embodiment of the invention is disclosed herein, it is to be understood that many changes may be made without departing from the spirit of the invention or the scope of the annexed claims. It is also to be understood that the words "electrical connecting devices" in the specification and annexed claims are not to be considered as limited to the connectors 5, but also include the terminals 3 or other electrical or conducting devices suitable for the purpose.

We claim:

1. In the method of making a storage battery, the steps of molding a cover about electrical connecting devices for said battery so that the body portions thereof are imbedded in the cover and ends thereof are arranged in rows on the bottom of the cover, securing the electrodes of the battery to poles, arranging the poles in rows and burning the poles to said ends of the electrical connecting devices to integrally secure the electrodes to the cover and to make the proper electrical connections between the electrodes.

2. In the method of making a multicell storage battery having a plurality of electrodes therein, the steps of imbedding a plurality of cell connectors in a cover for the battery so that the ends of the connectors project from the bottom of the cover, securing the electrodes of the battery to poles and uniting said ends and poles.

3. In the method of making a storage battery having electrodes therein, the steps of imbedding a terminal in the cover for the battery so that one end thereof projects from the bottom of the cover, securing a pole to one of said electrodes and uniting the pole and the end of the terminal which projects from the bottom of the cover.

4. A multi-cell storage battery comprising a jar having cells therein, electrodes and an electrolyte in each cell, a premolded cover for the jar, said cover being releasably inter-engaged with and supported on the jar, cell connectors and terminals embedded in the cover below its upper surface and having their lower end portions projecting downwardly therefrom, and fused metallic unions between said cell connectors and terminals and said electrodes whereby the electrodes are electrically connected to the cell connectors and terminals and are also mechanically supported thereby from said cover.

5. A storage battery comprising a jar, a pre-molded cover therefor, said cover being releasably inter-engaged with and supported upon said jar, positive and negative plates in said jar, straps connecting said plates, cell connectors and terminals embedded in the pre-molded cover below its upper surface and supported thereby by virtue of the cohesion of the material of the cover thereto, the lower ends of said cell connectors and terminals being beveled inwardly and projecting downwardly below the underside of said cover, and fused metallic unions between said beveled ends and said straps.

6. A storage battery comprising a jar, a pre-molded cover therefor, said cover being inter-engaged with and supported upon said jar, positive and negative plates in said jar, straps connecting said plates, cell connectors and terminals embedded in the pre-molded cover and supported and protected thereby by virtue of the cohesion therewith of the surrounding material of the cover, the lower ends of said cell connectors and terminals projecting downwardly below the under surface of the cover, and fused metallic unions between said lower ends and said straps whereby the plates are electrically connected with as well as mechanically supported on the cell connectors and terminals.

7. A storage battery comprising a jar, electrodes and electrolyte in said jar, a pre-molded cover for the jar, said cover being inter-engaged with and supported on the jar, electrical conducting members embedded in the pre-molded cover below its upper surface and protected and supported thereby by virtue of the cohesion therewith of the surrounding material of the cover, said electrical conducting members having end portions projecting downwardly below the under surface of the cover, and fused metallic unions between the lower ends of said electrical conducting members and said electrodes whereby the electrodes are electrically connected with and mechanically supported on said electrical conducting members.

8. A storage battery comprising a jar, a pre-molded cover for the jar, said cover being inter-engaged with and supported on the jar, electrical conducting members embedded in the pre-molded cover below its upper surface and having end portions projecting downwardly therefrom, storage battery plates in said jar, straps connected to said plates, and fused metallic unions between said straps and said electrical conducting members, said electrical conducting members having their lower ends tapering inwardly, said straps having flanges cooperable with said tapered ends to form outwardly opening pockets facilitating the formation of the fused metallic unions between the electrical conducting members and the straps.

9. A storage battery comprising a jar having partitions forming cell compartments, a pre-molded cover for the jar having channels inter-engaged with said partitions whereby the cover is supported on the jar, cell connectors and terminals embedded in said pre-molded cover, said cell connectors extending through the material of the cover below its upper surface and around said channels, said cell connectors and said terminals having their lower ends projecting downwardly beyond the cover, storage battery plates in said cells, straps connected to said plates, and fused metallic unions between said straps and said cell connectors and terminals.

GEORGE C. APPEL.
ROBERT W. VICAREY.
JOHN D. WANVIG, Jr.